United States Patent
Kallfass

[11] Patent Number: 5,398,448
[45] Date of Patent: Mar. 21, 1995

[54] APPARATUS CLOSING MECHANISM, PARTICULARLY FOR FILM WELDING DEVICES

[75] Inventor: Karl-Heinz Kallfass, Nürtingen, Germany

[73] Assignee: Kallfass Verpackungsmaschinen GmbH & Co., Germany

[21] Appl. No.: 119,909

[22] Filed: Sep. 10, 1993

[30] Foreign Application Priority Data

Sep. 11, 1992 [DE] Germany .................. 42 30 435.0

[51] Int. Cl.⁶ .................. E05F 15/12; B65B 9/02; B65B 51/14
[52] U.S. Cl. .................. 49/334; 49/29; 49/379; 53/568
[58] Field of Search .................. 192/84 R; 49/29, 334, 49/340, 379; 53/568

[56] References Cited

U.S. PATENT DOCUMENTS

| | | |
|---|---|---|
| 3,461,271 | 8/1969 | Reitzes . |
| 4,067,144 | 1/1978 | Ogishi .................. 49/29 X |
| 4,121,382 | 10/1978 | Dietrich et al. .................. 49/334 |
| 4,650,535 | 3/1987 | Bennett et al. .................. 53/568 X |
| 4,697,401 | 10/1987 | Kessler et al. .................. 53/568 |
| 4,945,712 | 8/1990 | Bennett .................. 53/568 X |
| 5,177,931 | 1/1993 | Latter .................. 53/568 X |

FOREIGN PATENT DOCUMENTS

| | | |
|---|---|---|
| 139589 | 5/1985 | European Pat. Off. . |
| 1580334 | 9/1969 | France . |
| 1128325 | 4/1962 | Germany .................. 49/340 |
| 1131136 | 6/1962 | Germany . |
| 1956557 | 6/1965 | Germany . |
| 2113270 | 10/1972 | Germany . |
| 2160585 | 12/1985 | United Kingdom .................. 49/334 |

*Primary Examiner*—Allan D. Herrmann
*Attorney, Agent, or Firm*—Quarles & Brady

[57] ABSTRACT

The welding frame (3) of a film-welding device (2) is at the start of its pivoting movement motor-driven in positive manner over a few radians and is then released from the drive, so that only on the basis of its flywheel energy and weight force is it moved on to the locked closed position. Thus, accident risks can be avoided without separate control means, because for stopping the welding frame (5) it is essentially only necessary to dissipate the relatively low flywheel energy.

24 Claims, 1 Drawing Sheet

APPARATUS CLOSING MECHANISM, PARTICULARLY FOR FILM WELDING DEVICES

BACKGROUND OF THE INVENTION

The invention relates to a closing mechanism, such as is used on devices, equipment, machines, etc. for transferring a unit into one or more precisely predetermined positions, e.g. in order to bring together a tool or another apparatus part with a counterpart, a workpiece, etc.

The movement of the closing unit or the like can be linked with numerous problems, namely e.g. with injury risks through the closing unit, with control problems with respect to the closing force, or the precise disconnection of the closing drive, etc. For example, for accident or injury protection purposes, it is often necessary to provide a light barrier or a similar sensor, so as to immediately switch off the closing drive and/or reverse to return travel, if foreign bodies have entered the closing gap or the movement path of the closing unit. Control problems also occur if the delivery or closing unit is firstly delivered at a higher speed in a rapid motion and then over the final part of the movement path is slowed down and transferred roughly into the predetermined position, optionally with increasing closing force towards the end of the associated movement path.

In the case of film or sheet welding devices and similar joining or processing mechanisms frequently a very simple, weight-based, lightweight construction is desired, so that complicated controls and in particular mechanical controls are not suitable. In addition, the moving masses must be kept to a minimum.

OBJECTS OF THE INVENTION

An object of the invention is to provide a closing mechanism of the aforementioned type, in which disadvantages of known constructions and/or of the described nature are avoided and which in particular has advantages of the indicated type or in the case of a very simple construction ensures high functional reliability and security against accidents, damage, etc.

SUMMARY OF THE INVENTION

For solving this problem the driving torque for the transfer of the closing unit into one or more of the indicated positions is so selected that the closing unit can be stopped or at least significantly slowed down by a counterforce over a partial path connecting onto said position and/or spaced therefrom, said counterforce being relatively small or corresponding to a countertorque, which is smaller than the maximum driving torque which occurs. For example, the driving torque can only be transferred to the closing unit on a partial path in a positive or slip-free manner and at the end of said partial path can be switched over to a non-positive driving connection which, when the counterforce occurs, automatically is separated as a reaction to said counter-force in the manner of a slip clutch.

However, it is particularly advantageous if the drive for the partial path to be secured is constituted solely by a inertia drive, a gravity force drive, etc. and no positive or slip-free drive is provided, because then the motive energy can be returned to zero by the counterforce only and without further control means and subsequently is no longer active, except for any gravitational forces. The inertia drive might include a separate flywheel mass connected by a gear connection to the closing unit and the gravity drive might include a separate weight mass connected to the closing unit either directly or through a gear connection.

Instead of a separate flywheel and/or weight mass for the drive, said mass can partly or completely be formed by the closing unit, so that there is no need for a gear connection between the mass and the closing unit. As a result of the gravity displacement of the mass the effective weight or flywheel force can be modified in stepless and/or stepped manner and as a result adapted or set to the particular requirements. Such an adjustment is also possible by modifying the time or the drive path of a slip-free motor drive. For example, said drive time can be approximately or below a half or a quarter second and in particular 0.2 to 0.35 second.

In addition, in and/or counter to the driving direction, the driving torque can also be influenced by a linear and/or stepped spring tension, damping, etc., so that the driving torque acting on the closing unit can be varied in accordance with the requirements in various different ways. Towards the end of the movement or flywheel movement the closing unit does not again have to be driven in slip-free manner in order to bring it into the indicated position. The movement characteristic can be chosen in such a way that the once given flywheel and/or weight force is adequate up to transfer into the said position, in which the closing force is then appropriately fixed by a positive and/or non-positive locking means, which in turn must cause no movement of the overall closing unit. The locking means can act as a shock absorbing means on the closing unit, so that even with a relatively high flywheel force, said mechanism can be stopped over a very short path and either at the end of the damping path is positionally secured or beforehand is returned over said damping path by the damping or absorbing mechanism and is then secured in this position.

Instead of for linear, rotary or similar movable closing units, the construction according to the invention is particularly suitable for closing units, which are movable in an arcuate trajectory, e.g. are pivotably mounted about a substantially apparatus-fixed axis. Significantly below 360°, the working path can approximately correspond to an arc angle of any integral multiple of 10° and in particular below 90°, namely at approximately 45°. The arcuate trajectory is advantageously chosen in such a way that also the mass of the closing unit acts as a weight force or a driving torque and/or influences the forces necessary for restoring to the starting position. With an approximately horizontal pivot axis and approximately horizontal working position, as a result of the weight force the driving torque continuously increases towards the working position or continuously decreases towards the starting position. whereas following the lifting of the slip-free drive, in the case of undisturbed normal operation, the flywheel energy continuously decreases towards the closed position or continuously increases towards the starting position.

The closing unit can be adjusted in such a way that, despite the acting return or restoring spring, it is substantially positionally secured in neutral equilibrium in the working position and/or in further positions at a limited distance therefrom. In the starting position or in further positions at a limited distance therefrom the closing unit can only be secured by the restoring spring tension and optionally also in substantially neutral equilibrium. This permits a very simple handling of the closing unit, which can be moved in freewheeling manner or fixed by hand in said sequences by the operator.

As a result of the construction according to the invention there is no need for additional safety precautions to prevent accidents and compared therewith the inventive construction ensures a much greater and in particular problem-insensitive security and safety. In place of a pneumatic drive or a mechanical drive by means of a tension member, such as a chain, the motor closing drive is provided by a direct drive of the locking unit by direct connection with a driving shaft, a motor shaft, a gear shaft, a driving clutch, a spring, a damping mechanism and/or a switching mechanism being positioned roughly in the axis of the movement path of the closing unit, which leads to a very compact construction. These or similar components can be provided in roughly equiaxial axial succession and/or coaxially in the vicinity of common longitudinal portions.

These and further features can be gathered from the claims, description and drawings and the individual features, either alone or in the form of subcombinations, can be realized in an embodiment of the invention and in other fields and can represent advantageous, independently protectable constructions for which protection is hereby claimed.

DETAILED DESCRIPTION OF A PREFERRED EXAMPLE EMBODIMENT

Figure 1:
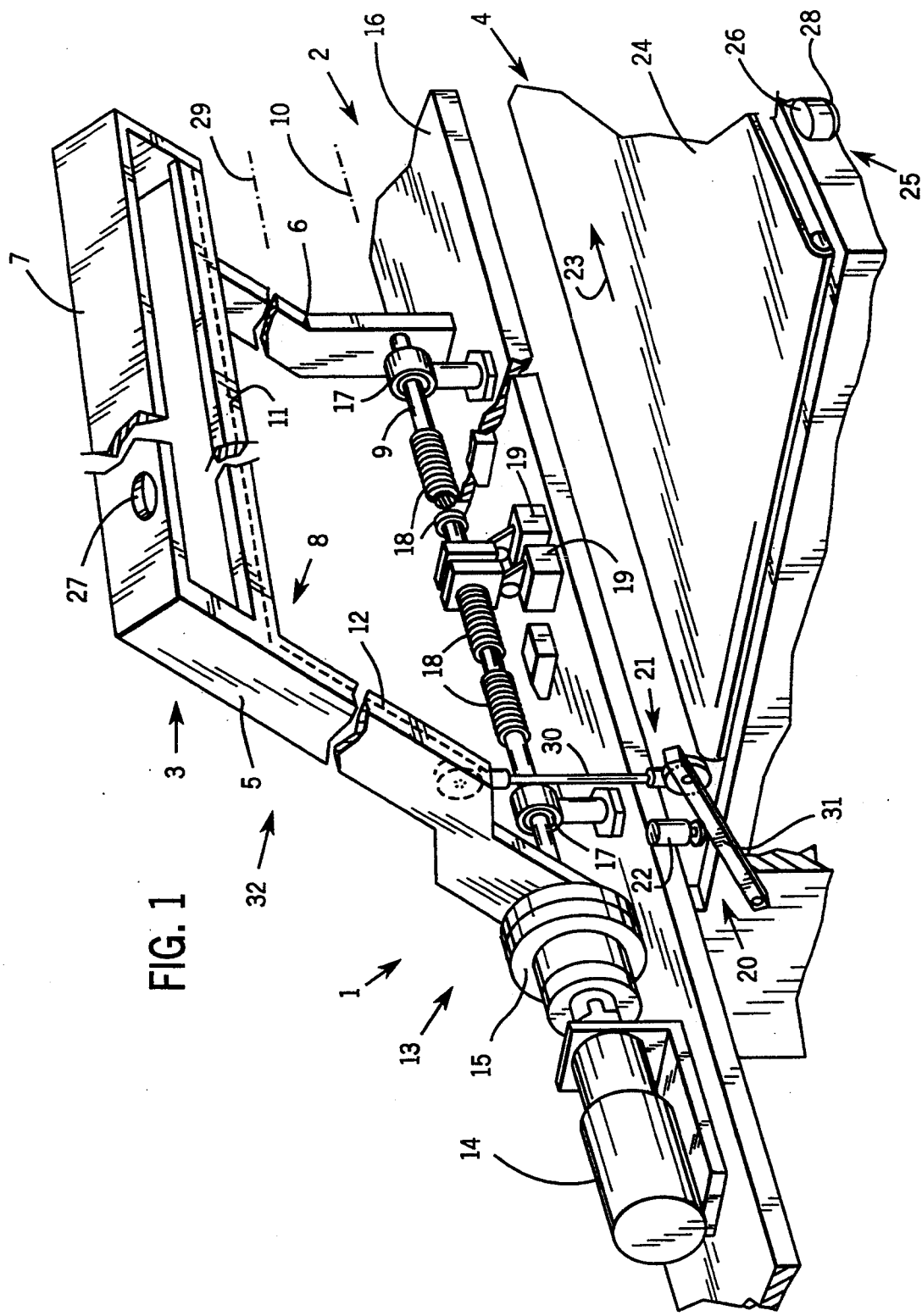
FIG. 1 is a schematic of a film welding device having a closing mechanism according to the present invention.

A closing mechanism 1 is provided here for a partly automatic or manually operable film or foil welding device, with which products to be packed are placed in time sequence between two superimposed film layers and then the latter are interconnected by welding along at least one or two packing edges laterally adjacent to the product. The film layers are interconnected in one-piece manner by means of a fold running roughly parallel to the conveying direction and are unwound from a not shown roll supply or store placed on a work table, on which the product for packing is also interposed and also the hot-wire welding can be carried out. A welding seam is then located on the packed product side remote from the fold and a further welding seam is at right angles to the conveying direction adjacent to the rear end of the conveyed product, the two film layers in the preceding hot-wire welding process being already interconnected in the conveying direction upstream of the product by means of the crosswise positioned welding tool, so that a pack completely closed over its circumference is obtained.

With such a welding device 2 the closing unit 3 jib bracket of the closing mechanism 1 is formed by a welding frame, whilst the counterunit 4 forming a closable and openable mouth, or a mouth whose opening width is variable is the work or feed table. Its support plane is roughly horizontal and in all possible working positions the closing unit 3 is above the counterunit 4, which is provided in substantially apparatus-fixed manner at right angles to its support plane.

The welding frame 3 has two freely projecting frame pieces 5, 6, which are spaced in the conveying direction and roughly parallel to one another and which in the vicinity of their ends are substantially rigidly interconnected by means of a transverse body 7. Spaced from said transverse body 7 the welding frame 3 carries a hot-wire welding tool and separating 8, which is positioned substantially between the transverse body 7 and a drive shaft 9 roughly parallel thereto and which is roughly parallel to the conveying direction, the feed table 4 and/or approximately horizontal. The shaft 9 connects the frame pieces 5, 6 in the vicinity of their ends remote from the transverse body 7 in a dimensionally rigid manner and defines the working axis 10 of the closing mechanism 1 about which the welding frame 3, including the shaft 9, is pivotable.

The approximately rectangular, angular welding tool 8 has a portion connecting the frame pieces 5 in dimensionally rigid manner and which is approximately parallel to the conveying direction, the feed table 4 or the transverse body 7 and which has a limited spacing from the latter. A portion 12 at right angles thereto is provided on the edge of the first frame piece 5 in the conveying direction facing the feed table and which like the other frame piece 6 has flat or rectangular cross-sections at right angles to the axis 10. With the welding frames 3 closed, the portion 12 extends substantially over the width of the feed table 4, whilst the portion 11 is positioned between the lateral boundaries of the feed table 4 close to the lateral boundary remote from the axis 10. The axis 10 can be roughly level with the support plane of the feed table or slightly above it, in such a way that with the welding frame 3 closed the welding zone of the entire welding tool 8 is roughly located in the support plane. The welding tool has a through welding wire uninterrupted over the two portions 11, 12 and which can be heated in such a way by electric power application, that during a welding process it simultaneously joins together in strip-like manner the two film layers along said pack edges and between the lateral boundaries cuts through the strip-like welding seam, so that the two layers in each case on either side of each separating point are interconnected by a welding seam.

For moving the welding frame 3 out of its starting position shown in the drawing with an approximately 45° inclination of the said closing position a drive 13 is provided, which acts in combined manner as a motor drive, a flywheel drive and a gravity drive. An electric motor or similar drive force emitter 14 is placed immediately adjacent to the outside of the frame piece 5 in the axis 10 and is drive-connectable to the welding frame 3 or the shaft 9 by a clutch 15 located between it and the frame piece 5 and is also completely separable from the shaft 9. Therefore the rotor 14 runs constantly, namely also when the clutch 15 is disengaged, instead of ending the slip-free driven part of the movement path in that the power action of the motor is switched off and subsequently the motor rotor only runs as part of the flywheel mass 32. The motor 14 can e.g. be provided laterally adjacent to the not shown film web storing means. The mechanical clutch 15 is e.g. constructed as an electromagnetic clutch, which in the disengaged state separates in substantially resistance or friction-free manner the driving connection.

The motor 14 is fixed to an apparatus base 16 and namely to a support plate on which the welding frame 3 is also mounted. For its mounting are provided approximately friction-free bearings 17 positioned exclusively between the frame pieces 5, 6 and fixed to the support plate and which are in each case positioned adjacent to the insides of the frame pieces 5, 6 and are in the form of antifriction bearings. Between the frame pieces 5, 6 or the bearings 17 the shaft 9 is surrounded by substantially four fitted springs 18, which are arranged in axially spaced succession, can be identical and are constructed as helical springs, which act as torsion springs. One spring end is in each case positively fixed with respect to the shaft 9, whereas the other spring end is positively supported on an abutment of the base 16.

The position of the welding frame 3 is e.g. monitored by two switches 19, which are operated by cams, placed in non-rotary manner on the shaft 9 and which can be roughly positioned in the centre between the frame pieces 5, 6, the bearings 17 or the springs 18. These switches 19 appropriately belong to a control mechanism 20, which can in particular be provided for breaking off in sudden manner the slip-free motor drive of the welding frame 3 as a function of its position or angular position and/or in time-dependent manner by disengaging the clutch 15.

A control linkage 21 has a guide rod 30 transversely positioned or approximately at right angles to the plane of the feed table 4, which is spaced from the axis 10 or is articulated between the latter and the portion 11 of the welding tool 8 to the inside of the frame piece 5. Another guide rod 31 is pivotably mounted roughly level with the table plane or slightly below it on the base 16, the two guide rods being interconnected in articulated manner with their ends remote from the said bearings. The guide rod mounted on the base 16, towards the end of the restoring movement, runs onto a mechanical absorbing means 22, which defines a short absorbing or damping path and can also serve as a stop for the starting position.

The feed table 4 is substantially formed by the upper strand of a revolving drivable conveyor belt 24 with which, following each welding process, the packed product can be conveyed on stepwise by one product length in the conveying direction 23, so that then a new film portion is located in the working area of the welding frame 3 or the welding tool 8. For the positional securing of the welding frame 3 a locking means 25 is provided in the closed position and spaced from the axis 10 or the shaft 9 engages in the vicinity of the free bracket end of the welding frame 3, namely substantially on the transverse body 7. On the side of the feed table 4 remote from the axis 10, the locking means can have one or more holding magnets 26, appropriately in the form of electromagnets, fixed to the base 16. With each holding magnet 26 is associated on the welding frame 3 a counterpart 27 in the form of a ferromagnet, which is appropriately fixed to the outside of the transverse body 7. In the closed position of the welding frame 3, the counterpart 27 is in contact with the holding magnet 26, so that the welding frame 3 is secured when the magnet 26 is energized.

With the counterpart or the holding magnet can be associated a damping or absorbing means 28, which gives the damped component a short damping path and then automatically returns said component to the starting position. In place of a magnetic locking means it is also possible to have a positive locking means, whose damping path can then serve optionally for the driving of movable bolt members, so that the locking means is also only driven or engaged by the flywheel mass.

For the operation of the welding device 2 or the closing mechanism 1, with the motor 14 running, the clutch 15 is engaged for a very short time of approximately 0.2 to 0.35 seconds, in such a way that the slip-free driving connection is only provided over a rotation angle of approximately 5° to 10°. At the end of this short movement path the clutch 15 is disengaged again, e.g. in path or angle-dependent manner, so that the welding frame 3 is completely driveless. Over the entire rotary movement the springs 18 which are under restoring pretension in the starting position are increasingly tensioned. The gravity axis 29 of the welding frame 3, which is closer to the transverse body 7 or the free end of the welding frame 3 than to the axis 10 and which is parallel to the latter, during the pivoting movement acquires an everincreasing horizontal spacing from the axis 10, so that the gravity action correspondingly increases.

The tension of the springs 18 and the said, oppositely directed action of gravity can be so matched or adjusted to one another that they balance one another out, so that following the disengagement of the clutch 15 in particular the flywheel mass is decisive for the further movement of the welding frame 3. In the closed position the weight force can exceed the spring tension, so that the welding frame 3 is held in said closed position in monostable manner by the weight force. The same can also apply for a slightly opened position and only after reaching an even further opened position and in the starting position does the restoring force of the springs preponderate and as a result the welding frame 3 is automatically transferred to the starting position and held in monostable manner in the stop-limited starting position.

The indicated flywheel force is sufficient for transferring in driveless manner into the closed or secured position the said welding frame 3 over most of its total movement path and in said position it is positionally secured by the locking means 25. The welding tool 8 acts in the described manner in said closed position.

With, following the disengagement of the clutch 15, a resistance directed in opposition to its movement acts on the welding frame 3, then it immediately absorbs the relatively small flywheel and weight energy and stops the frame 3, without there being injury or damage. The control mechanism 20 is constructed in such a way that subsequently the welding frame 3 must be transferred manually into the closed position and then into the open position, so as to to engage the clutch 15 and restore the driving connection. The locking means 25 can be operated by means of a limit switch, e.g. one of the switches 19. Instead of an electromotor the drive can also be an air motor, a pneumatic or hydraulic cylinder unit, etc. Each of the described components or each of the described arrangements can be provided one or more times, e.g. in order to successively, in juxtaposed and/or superimposed manner provide a number of closing mechanisms for the simultaneous and/or successive production of closed packs, etc.

I claim:

1. An apparatus closing mechanism comprising:
   a base (16);
   at least one closing unit (3) movably mounted on said base (16) by at least one bearing (17), said closing unit (3) being displaceable between a closing position and an initial position in an operating motion and over a closing path including a first path section and a second path section, said second path section connecting to said first path section at an intermediate position between said initial position and said closing position, said second path section connecting to said closing position;
   a drive (13) for operably displacing said closing unit (3) with a specified drive torque; and a drive connection for drivingly connecting said drive (13) with said closing unit (3), wherein control means are provided for reducing said drive torque with respect to said first path section as a function of said closing path at said intermediate position and over said second path section, said drive driving said closing unit over said first path section, over said second path section said closing unit (3) being substantially free of said driving torque and being driven substantially only by at least one kinetic mass force introduced over said first path section.

2. The apparatus according to claim 1, wherein said drive connection includes a clutch that disrupts said drive connection at the intermediate position so that over said second path section said at least one closing unit (3) is entirely disconnected from said drive 3. The apparatus according to claim 2, wherein over said second path section said at least one closing unit (3) is free from any positive drive torque and driven only by said at least one kinetic mass force providing an inertia force, said drive including an output drive shaft, over said second path section, said at least one closing unit (3) being entirely disconnected from said output drive shaft.

4. The apparatus according to claim 1, wherein at least one of said kinetic mass forces is provided by an inertia force drive having a flywheel mass 32 being substantially constantly drive-connected to said at least one closing unit (3).

5. The mechanism according to claim 4, wherein at least one of said flywheel mass is connected in positionally substantially fixed manner to at least one of said closing unit (3).

6. The mechanism according to claim 4, wherein at least one of said flywheel mass is substantially entirely provided by at least one of said closing unit (3).

7. The apparatus according to claim 1, wherein at least one of said kinetic mass forces is provided by a gravity force drive having a driving weight mass which is substantially constantly connected in fixed manner to said at least one closing unit (3).

8. The mechanism according to claim 7, wherein at least one of said weight mass is directly connected to at least one of said closing unit (3) in positionally substantially fixed manner.

9. The mechanism according to claim 7, wherein at least one of said weight mass is substantially entirely provided by at least one of said closing unit (3).

10. The mechanism according to claim 1, wherein said drive torque is at least one of reduced and stopped over only a path section of said closing path, said path section substantially connecting to said closing position.

11. The apparatus according to claim 1, wherein said drive torque is at a maximum torque value only on the first path section.

12. The mechanism according to claim 1, wherein said drive includes a drive force emitter (14) and at least one drive connection to at least one closing unit (3), at least one of said drive connection being substantially interrupted only over a path section of said closing path.

13. the apparatus according to claim 1, wherein said control means are provided for steeply rising said drive torque to a maximum torque value at a beginning of a closing path, for substantially abruptly decreasing said drive torque value and for again subsequently but slowly increasing said drive torque value over a path section of said closing path multiply longer than path sections associated with said rising and said decreasing.

14. The mechanism according to claim 1, wherein said control means are provided for inducing a resilient tension counter to said drive torque over at least a path section of said closing path, said resilient tension including at least one spring tension substantially continuously increasing as a function of said closing path, adjusting means being provided to adjust at least one of said spring tension to a substantially neutral state of dead weight equilibrium of at least one of said closing unit (3), at least one of said spring tension providing at least one of a restoring force and a position holding force for at least one of said closing unit (3).

15. The mechanism according to claim 1, wherein a damping means (28) is provided for counteracting said operating motion over at least a path section of said closing path, said damping means (28) being dampingly effective in at least one of a path section of said closing path connecting on to said closing position and at least one abutted position of at least one of said closing unit (3).

16. The apparatus according to claim 1, wherein said drive (13) includes at least one of an electromechanical drive, an electromotor (14) and at least one driving shaft, at least one of said driving shaft being drive-connected via a switch clutch (15) to said at least one closing unit (3).

17. The apparatus according to claim 1, wherein at least one of said path sections is at least partly an arcuate trajectory, at least one of said path sections being oriented in a height direction, at least one of said closing unit (3) providing a jib bracket projecting substantially freely adjacent at least one of said bearing (17) and substantially horizontally in said closing position.

18. The mechanism according to claim 1, wherein at least one of said closing unit (3) is pivotably mounted about at least one closing axis (10) at least in part substantially positionally stable with respect to said base (16), at least one of said closing axis (10) being substantially parallel to a workpiece conveying direction (23), at least one of said closing unit (3) being movable downwards towards said closed position.

19. The mechanism according to claim 1, wherein at least one of said closing unit (3) is positively driven over substantially at least one of 1/10, 1/8, 1/5, and 1/4 of said closing path with an increased closing drive torque.

20. The mechanism according to claim 1, wherein at least one of said closing unit is positively driven over an arcuate path section of said closing path of substantially between 5° to 10° arc angle with an increased closing drive torque, at least one of said closing unit (3) being positively driven at least one of in time dependent operation, and in path-dependent operation with said increased closing drive torque.

21. The mechanism according to claim 1, wherein at least one of said closing unit (3) defines a functional axis (10), at least one of a motor drive (14), a drive torque control mechanism (15) and at least one spring (18) being located substantially in said functional axis (10) of at least one of said closing unit (3), said motor drive and said control mechanism (15) being at least partly positioned laterally adjacent to at least one of said closing unit (3), at least one of said spring (18) being positioned at least one of between lateral boundaries of said closing unit (3) and on a shaft (9).

22. The mechanism according to claim 1, wherein for at least one of said closing unit (3) is provided at least one locking means (25) constructed to at least one of positively and non-positively holding said closing unit (3) in at least one of said closing position, at least one of said locking means (25) including at least one locking magnet (26) and at least one of said locking means including at least one locking bar.

23. The apparatus according to claim 1, including support arms (5,6) on either side of said closing unit (3) mutually laterally spaced, wherein, in the vicinity of an end of at least one of said support arms (5, 6) and connecting said support arms (5, 6) a welding and separating tool (8) is provided, a workpiece conveyor (24) being provided and constructed to form a counter-unit (4) opposingly facing said closing unit (3).

24. The mechanism according to claim 1, wherein said closing unit (3) provides a closing tool bracket of a foil welding device.

* * * * *

UNITED STATES PATENT AND TRADEMARK OFFICE
CERTIFICATE OF CORRECTION

PATENT NO. : 5,398,448

DATED : March 21, 1995

INVENTOR(S) : Kallfass, Karl-Heinz

It is certified that error appears in the above-identified patent and that said Letters Patent is hereby corrected as shown below:

Col. 2, line 55   The "period" should be a --,--.

Col. 3, line 17   After "equiaxial", the word "axial" should be deleted.

Col. 3, line 26   "DRAWINGS" should be --DRAWING--.

Col. 3, line 54   "unit 3" should be --unit 3 or--.

Col. 4, line 24   After "remote", delete ".".

Col. 4, line 41   "of" should be --to--.

Col. 6, line 43   "so as to to engage" should be --so as to reengage--.

Col. 7, line 17   "drive" should be --drive (13)--.

Col. 7, line 42   "in fixed" should be --in a fixed--.

Col. 7, line 63   "the" should be --The--.

Signed and Sealed this

Fourth Day of July, 1995

Attest:

BRUCE LEHMAN

Attesting Officer

Commissioner of Patents and Trademarks